June 10, 1958  J. J. DELISO  2,837,935
INVERTED MILLING MACHINE
Filed June 26, 1952  2 Sheets-Sheet 1

INVENTOR.
JOHN J. DELISO
BY
*Charles R. Fay*
ATTORNEY

June 10, 1958  J. J. DELISO  2,837,935
INVERTED MILLING MACHINE
Filed June 26, 1952  2 Sheets-Sheet 2
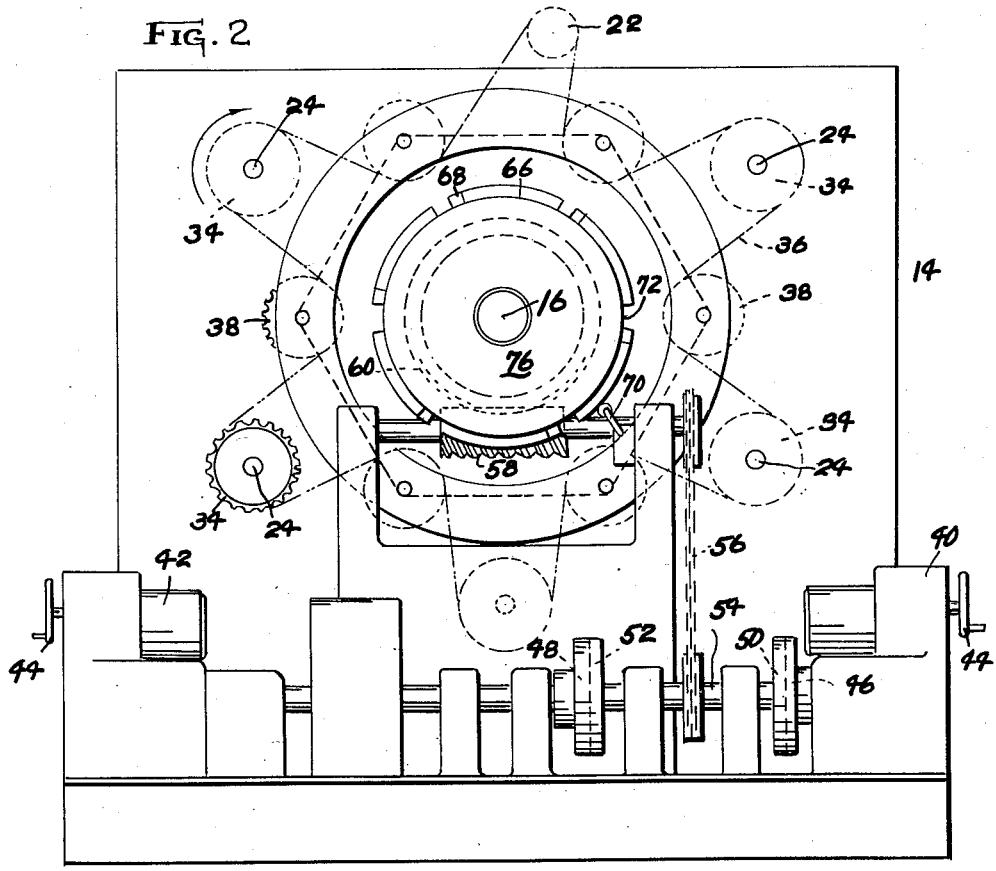
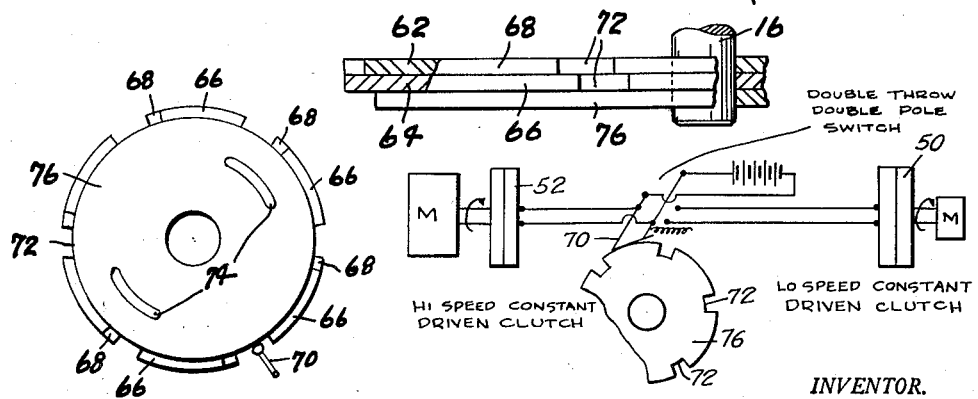
INVENTOR.
JOHN J. DELISO
BY Charles R. Fay,
ATTORNEY

United States Patent Office 2,837,935
Patented June 10, 1958

2,837,935
INVERTED MILLING MACHINE
John J. Deliso, Shrewsbury, Mass.

Application June 26, 1952, Serial No. 295,690

9 Claims. (Cl. 74—665)

This invention relates to a new and improved inverted milling machine, that is, a milling machine having a rotary turret or head, for holding the work, mounted on a horizontal axis to be indexed to pass a series of fixed cutters, each of which will perform a cutting action on the individual work-pieces, advancing the progress of the formation of the finished product from one station to the next, all the cutting being done in such a way and in such a relation to the turret or head that the chips fall by gravity down out of the turret and off the cutters, the provision of a milling machine as above described including a loading station located at the topmost portion of the head or turret, so that the work is gradually moving downwardly during the first cut and a succeeding cut and in all cases the work is not on a horizontal part of the turret except possibly when the work is completely upside down at a bottom station.

A further object of the present invention resides in the provision of a milling machine having a series of successive cutters arranged to make operations on work-pieces thereon and their being special new and improved control means for fast traverse between cutting or operating stations and slow feed while operating on the work-pieces; the respective distances for the fast traverse and slow feed being easily and instantly variable for different kinds and locations of work, so that maximum efficiency may be had, particularly as to time cycles involved in the particular work being done; and the provision of a driving means for a milling machine as above stated including a pair of motors, one of which is adapted to drive the turret or head at a relatively high speed and the other at a relatively low speed, the first being for "traverse" or travel, and the second being for cutting operation, each motor being continuously operated and driving an element of a separate magnetic clutch, which clutches are energized alternately selectively, to drive the turret at either a fast or a slow speed; and the provision of control means for the turret including a pair of discs mounted on one axis and easily and quickly rotated relative to each other, each disc having a plurality of sectors extending radially therefrom, said sectors overlapping circumferentially and upon rotative adjustment of one disc relative to the other, increasing or decreasing the peripheral lengths of the sectors and the gaps in-between, in combination with a switch actuator which is controlled by said combined sectors to throw the respective magnetic clutches into or out of operation.

Other objects and advantages of the invention will appear hereinafter.

Reference is to be had to the accompanying drawings, in which

Fig. 2 is a view in rear elevation thereof;

Fig. 3 is a plan view of the control discs; and

Fig. 4 is an enlarged edge view thereof, parts being in section and cut away.

Fig. 5 is a schematic wiring diagram.

Figure 1:
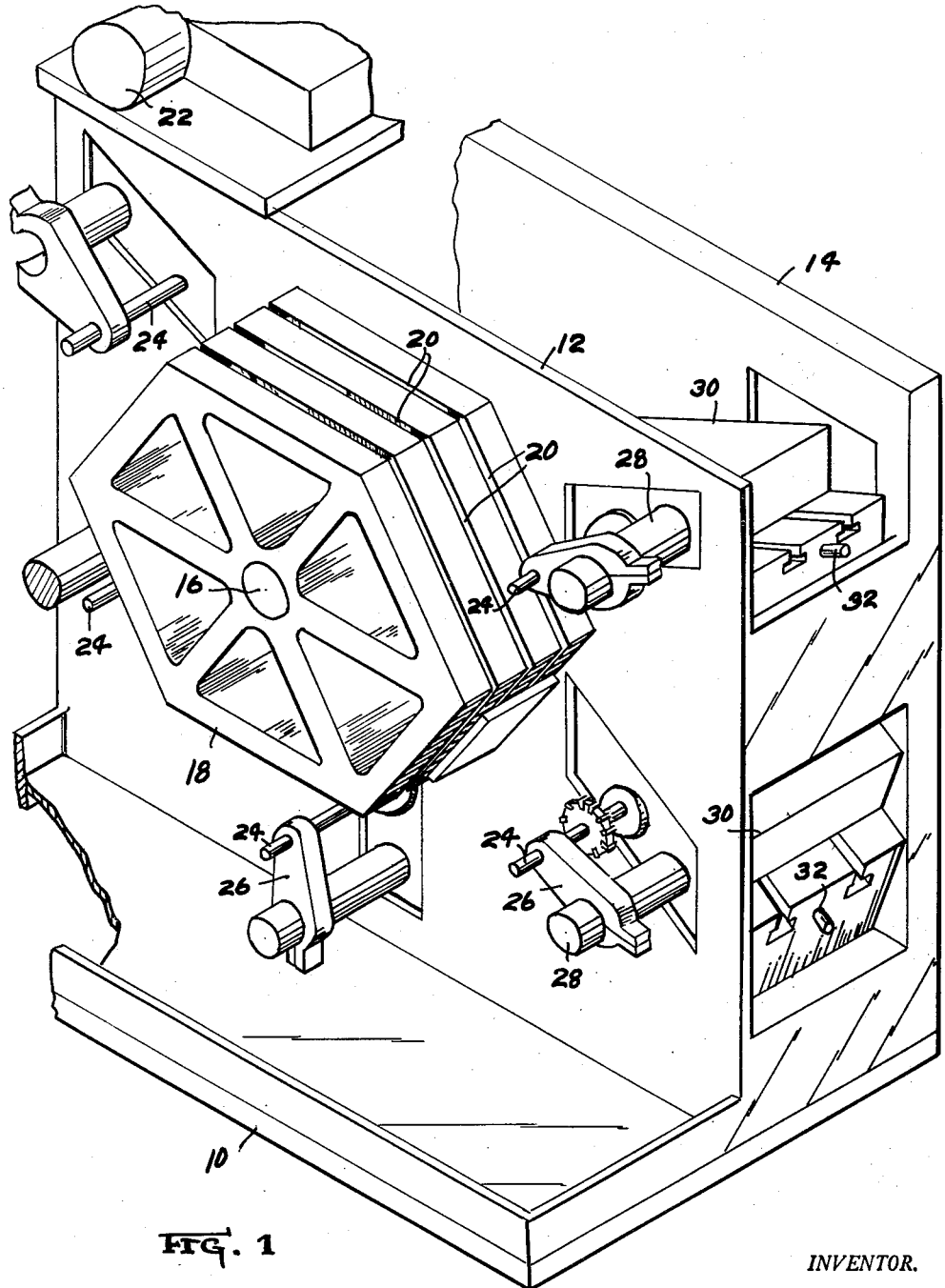
Fig. 1 is a perspective view of the front part of a milling machine according to the present invention, parts being in section.

Referring now to Fig. 1, there is provided a strong and rigid base indicated at 10, the same being provided with a pair of vertical upright spaced walls 12 and 14, the latter being especially strong. These walls support between them most of the parts of the machine to be described and journal a shaft 16 upon which is mounted a polygonal heavy turret or head 18, said turret or head 18 having a plurality of flat peripheral sides with under-cut slots 20 thereon, said slots providing for securing work-holding and indexing devices thereto in adjusted relation on each one of the flat side surfaces. The indexing and work-holding means do not form a part of the present invention and are not illustrated, but is to be understood that when a flat surface of the turret 18 is uppermost, it may be loaded by an operator and then as the head 18 progresses in its travel in a clockwise direction, it will pass by a plurality of successive cutters or other operating devices and in between said cutters it may be indexed so as to mill out polygons, increasing depths, etc. Of course it is desirable that all the work-pieces be located so that the working parts of the cycle are more or less simultaneous for slow working feed of the turret head, and also fast travel of the head between the working operations, and it is an important part of this invention to provide a very easily operated simple and practical device for accomplishing this result.

The walls 12 and 14 also support a main driving motor 22 arranged to rotate a series of cutter shafts 24, which shafts are arranged about the periphery of the turret, as clearly shown, and are mounted on cutter arms 26 in turn mounted on strong, rigid supports 28, which are in turn mounted on sliding blocks 30 supported between the walls 12 and 14 and radially adjustable relative to the axis of shaft 16 by means such as screw shafts 32 or the like.

The shafts 24 are all driven simultaneously and each is provided at the rear of the machine with a sprocket 34 and a single continuous sprocket chain 36 which goes over each sprocket and under a series of idlers 38. One of these idlers may be adjustable to take up the slack in the chain according to the adjustment of the blocks 30, so that it is seen that a relatively simple but positive and continuous driving means is provided for the various cutters.

At the rear of the machine, the base 10 provides a support for a relatively high speed driving motor 40 and a low speed similar motor 42, each of which, however, may be controlled by a conventional speed changer operated by the handles 44. Each motor is connected to drive one element of a magnetic clutch indicated at 46 and 48, these clutches each having another driven element 50, 52 respectively, appropriately journalled to drive a shaft 54, but the clutches operate only alternatively and not simultaneously.

The shaft 54 drives a sprocket chain 56, in turn driving a large worm 58 which is in constant mesh with a worm wheel indicated at 60 and which is directly connected to shaft 16, rotating the same. Thus it is seen that it is possible to drive the turret 18 at either a relatively fast non-working speed or "traverse," or at a relatively low working or milling speed. In the usual milling machine, these speeds are referred to as "fast," "traverse" and "slow feed," and the speeds would correspond in some degree to the usual speeds found in milling machines.

The magnetic clutches are electrically controlled by energizing or de-energizing thereof by a pair of discs 62 and 64, each of these discs being substantially the same and having a series of radially extending sectors 66, 68 forming combined lands. A feeler type electric switch actuator is mounted on a pivoted arm 70 and the discs 62 and 64 being fast to the shaft 16 and rotating therewith, move switch arm 70 by means of sectors 66 and 68, so that it alternates between a position where it runs on the peripheries of the respective sectors 66, 68, in combination, or upon the peripheral surfaces or gaps 72 between sectors. The electrical connections which are not shown are such as to energize one clutch 50 (or 52) when the switch arm is riding on the peripheries of the sectors 66, 68, and to energize the other clutch when riding on the surfaces 72, such energization being mutually exclusive so as to provide that but one motor is actually driving the turret at any one period of time.

The discs 62, 64 may be secured and bolted together by means of fasteners which extend through slots as those at 74 in a third plate 76 located in front of the control discs, as clearly shown in Figs. 3 and 4.

It will be seen that this invention provides a milling machine carrying out the objects thereof. The operator may load the machine when a flat portion of turret 18 is uppermost and after the next fast traverse, the piece that has just been loaded will be milled by the cutter on the next shaft 24; after the slow cutting feed, the turret is automatically driven at a fast speed and there may be if desired an index step between the first and the second stations, etc. All the milling is done in an inverted manner so that the chips fall off by gravity on to the base 10 and the machine is kept clean. The feed for the respective cutters is relatively simple, easily adjusted and capable of long operation without excessive wear.

The turret head 18 is very heavy and is held extremely firmly against any wabble in the feed by the heavy worm and worm wheel, there being no back-lash whatsoever in these gears. The control member for the fast travel and slow working feed is extremely easy to change, is simple in operation, but at the same time provides for a maximum efficiency and highest possible production of parts, which of course drop out or are removed just before the loading station, in finished form, it being possible in the present case to provide for five separate operations. The number of operations, of course, is not a limiting factor and may be varied.

Work-pieces may be set upon the various flats of the milling head 18 and then the discs 62, 64 may be adjusted relative to each other to provide for an exact feeding interval for the non-cutting traverse. If it is found that the work-piece was so set up slightly off center on a flat as respects the direction of travel, the discs may be manipulated in either direction so as to initiate the work feed sooner or later and also to terminate the work feed at the point desired. It is of course clear that this adjustment may be made at either the beginning or the end of the work-feeding space by adjusting both discs for a single interval.

Having thus described my invention and the advantages thereof, I do not wish to be limited to the details herein disclosed, otherwise than as set forth in the claims, but what I claim is:

1. A machine comprising a base, a shaft thereon, a turret on the shaft, means to rotate the shaft at a plurality of different speeds including fast traverse and slow feed, and said means including adjustable means to change the initiation and termination of the rotative steps of different speeds of the turret including a pair of angularly adjustable discs and means thereon to provide adjustable lands and gaps.

2. A machine comprising a base, a shaft thereon, a turret on the shaft, means to rotate the shaft at a plurality of different speeds including fast traverse and slow feed, and said means including adjustable means to change the initiation and termination of the rotative steps of different speeds of the turret including a pair of angularly adjustable discs and means thereon to provide adjustable lands and gaps and a feeler switch actuator therefor.

3. A machine comprising a base, a shaft thereon, a turret on the shaft, means to rotate the shaft at a plurality of different speeds including fast traverse and slow feed, and said means including adjustable means to change the initiation and termination of the rotative steps of different speeds of the turret including a pair of rotatively adjustable discs on the shaft and means on the discs forming combined lands and gaps adjustable in length according to the rotative adjustment of the discs.

4. A machine comprising a base, a shaft thereon, a turret on the shaft, means to rotate the shaft at a plurality of different speeds including fast traverse and slow feed, and said means including adjustable means to change the initiation and termination of the rotative steps of different speeds of the turret including a pair of rotatively adjustable discs on the shaft and means on the discs forming combined lands and gaps adjustable in length according to the rotative adjustment of the discs, and a feeler switch riding on the lands and gaps and controlling the actuation of the shaft rotating means.

5. A machine comprising a rotary turret, a shaft therefor, means to rotate the shaft, means controlling the speed of the shaft including a pair of magnetic clutches, means connecting the clutches to the shaft to drive the shaft, means controlling the clutches for selective alternating energization to drive the shaft alternatively at different speeds, said clutch control means including electric means to energize each clutch and de-energize the other, and control means for the clutch energizing and de-energizing means, said control means being rotatable with the turret and including elements engaging and disengaging said switch means to vary the speed of rotation thereof according to the rotative position of the turret.

6. Apparatus of the class described comprising a rotary turret, a shaft therefor, power means to rotate the shaft, means controlling the speed of the shaft including a pair of magnetic clutches operating alternately at different speeds and connected to the shaft for driving the same, switch means to energize each clutch and de-energize the other clutch, means on the shaft and rotating therewith to control the clutch energizing and de-energizing means, and means to adjust the control means to vary the points of changing speed of the shaft, said control means comprising sectors for engaging and disengaging the switch means.

7. Apparatus of the class described comprising a rotary turret, a shaft therefor, power means to rotate the shaft, means controlling the speed of the shaft including a pair of magnetic clutches operating alternately at different speeds and connected to the shaft to drive the same, switch means connected in circuit to energize each clutch and de-energize the other clutch, means on the shaft and rotating therewith to control the clutch energizing and de-energizing switch means, and means to adjust the circumferential position of the control means to vary the points of changing speed of the shaft, said control means comprising a pair of discs on the shaft and outwardly extending lands on each disc, the discs being rotatively adjustable, and the switch means lying in the path of the lands.

8. Apparatus of the class described comprising a rotary turret, a shaft therefor, power means to rotate the shaft, means controlling the speed of the shaft including a pair of magnetic clutches operating alternately at different speeds and connected to the shaft and driving the same at different speeds, a circuit including a switch to energize each clutch and de-energize the other clutch, means on the shaft and rotating therewith to control the clutch energizing and de-energizing switch, and means to adjust the control means to vary the points of changing speed of the shaft, said control means comprising a pair of discs on the shaft, and outwardly extending lands on each disc, the discs being rotatively adjustable in either direction circumferentially of the turret to extend the lands backward or forward as well as to vary the lengths thereof, said switch lying in the path of the lands.

9. Apparatus of the class described comprising a rotary turret, a shaft therefor, power means to rotate the shaft, means controlling the speed of the shaft including a pair of magnetic clutches operating alternately at different speeds and connected to the shaft to drive it, means to energize each clutch and de-energize the other clutch, means on the shaft and rotating therewith to control the clutch energizing and de-energizing means, and means to adjust the control means to vary the points of changing speed of the shaft, said control means comprising a pair of discs on the shaft and outwardly extending lands on each disc, the discs being rotatively adjustable to vary the lengths of the lands, and gaps therebetween, said clutch energizing means including an electric feeler type switch actuator riding on the lands and gaps.

References Cited in the file of this patent

UNITED STATES PATENTS

| | | |
|---|---|---|
| 1,700,309 | Cole | Jan. 29, 1929 |
| 1,926,332 | Fournier | Sept. 12, 1933 |
| 1,976,103 | Archea | Oct. 9, 1934 |
| 2,314,019 | Shaw | Mar. 16, 1943 |
| 2,355,082 | Kearney | Aug. 8, 1944 |
| 2,364,884 | Weimer | Dec. 12, 1944 |
| 2,387,343 | Panish | Oct. 23, 1945 |
| 2,585,607 | Whitmore | Feb. 12, 1952 |
| 2,629,468 | Jelinek | Feb. 24, 1953 |